United States Patent
Kawabe et al.

(10) Patent No.: US 7,346,330 B2
(45) Date of Patent: Mar. 18, 2008

(54) SOFTWARE-DEFINED RADIO APPARATUS

(75) Inventors: Manabu Kawabe, Hachioji (JP); Katsuhiko Tsunehara, Hachioji (JP); Hirotake Ishii, Hachioji (JP); Takashi Ishikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 11/218,484

(22) Filed: Sep. 6, 2005

(65) Prior Publication Data

US 2006/0052094 A1    Mar. 9, 2006

(30) Foreign Application Priority Data

Sep. 7, 2004  (JP)  ............ 2004-259133
Mar. 4, 2005  (JP)  ............ 2005-059855

(51) Int. Cl.
*H04M 3/00*   (2006.01)

(52) U.S. Cl. ............... 455/343.4; 455/418; 455/419; 370/395.4

(58) Field of Classification Search ............ 455/418, 455/419, 343.4, 424; 370/395.4, 448, 468
See application file for complete search history.

(56) References Cited

U.S. PATENT DOCUMENTS

| | | | |
|---|---|---|---|
| 3,596,246 A * | 7/1971 | Nakagome et al. | 370/366 |
| 4,215,244 A * | 7/1980 | Gutleber | 370/347 |
| 5,648,991 A * | 7/1997 | Namekata et al. | 375/341 |
| 5,694,428 A * | 12/1997 | Campana, Jr. | 375/260 |
| 5,777,984 A * | 7/1998 | Gun et al. | 370/230 |
| 5,812,527 A * | 9/1998 | Kline et al. | 370/232 |
| 5,835,541 A * | 11/1998 | Namekata et al. | 375/355 |
| 6,088,405 A * | 7/2000 | Hladik et al. | 375/341 |
| 6,198,783 B1 * | 3/2001 | Campana, Jr. | 375/346 |
| 2005/0143129 A1 * | 6/2005 | Funk et al. | 455/560 |
| 2007/0036163 A1 * | 2/2007 | DiBiasio et al. | 370/395.4 |

FOREIGN PATENT DOCUMENTS

JP    2000-138651    10/1998

* cited by examiner

*Primary Examiner*—Matthew Anderson
*Assistant Examiner*—Minh Dao
(74) *Attorney, Agent, or Firm*—Reed Smith LLP; Stanley P. Fisher, Esq.; Juan Carlos A. Marquez, Esq.

(57) ABSTRACT

To simplify the configuration of functional modules in a software-defined radio apparatus, and facilitate the development of software. The functional modules have input and output terminals of a common configuration. Distributed timing control is performed so that the functional modules operate in their respective timings, and the functional modules have common input/output signals.

16 Claims, 8 Drawing Sheets

SOFTWARE-DEFINED RADIO APPARATUS

CLAIM OF PRIORITY

The present application claims priority from Japanese patent application P2004-259133 filed on Sep. 7, 2004 and P2005-59855 filed on Mar. 4, 2005, the content of which is hereby incorporated by reference into this application.

BACKGROUND OF THE INVENTION

This invention relates to radio apparatus including processing units whose function can be changed by modifying software, that is, so-called software-defined radio apparatus.

The radio apparatus having been conventionally used comprises a protocol processing unit, a baseband processing unit, and a modulating/demodulating module (JP 2000-138651 A). Transmission data transmitted from the protocol processing unit is converted into a baseband signal of a band matching a radio system in the baseband processing unit, converted into a signal of a radio-frequency band in the modulating/demodulating module, and transmitted from an antenna. The signal of the radio-frequency band received from the antenna is converted into a baseband signal in the modulating/demodulating module, baseband demodulated in the baseband processing unit, and sent to the protocol processing unit as reception data. The result of the baseband signal processing is outputted to the modulating/demodulating module as a modulated signal in the case of transmission, and is outputted to the protocol processing unit as demodulated data in the case of reception.

A method is known which enables part of processing in the radio apparatus to be functionally changed by software. Individual functional modules are replaced by those complying with the new system, the order of connections of the functional modules is changed, or parameters are changed when accommodating a new radio system.

SUMMARY OF THE INVENTION

The above-mentioned related art requires a control unit that collectively controls plural functional modules responsible for the functions of the baseband processing unit. The control unit controls the timing and the like of signal processing in each of the functional modules. Therefore, when accommodating a different radio system, it is insufficient to simply rearrange the functional modules, and the control unit that unifies them must also be remade into one that accommodates a new radio system. Accordingly, accommodation to a new radio system will require great design changes and cause an increase in development time.

In one feature of this invention, to solve the problem, functional modules have input and output terminals of common configuration. Distributed timing control is performed so that the functional modules operate according to their respective timings, and common control signals inputted and outputted to and from the functional modules (sent successively from a functional module of the forefront stage to functional modules of subsequent stages) are provided. In this configuration, functional modules can be freely rearranged, and new radio systems can also be accommodated by changing connections of the functional modules and parameters. Freedom to rearrange of the functional modules is increased, so that development time required to achieve a new radio system can be reduced.

According to one embodiment of this invention, distributed processing of timing control can be performed in the software-defined radio apparatus. Thereby, independence of the functional modules constituting the software-defined radio apparatus can be increased, and a library having a high degree of reusability can be created. Since an independent timing control unit dependent on radio systems does not need to be provided, radio systems can be easily changed by rearrange of the functional modules.

BRIEF DESCRIPTION OF THE DRAWINGS

The present invention can be appreciated by the description which follows in conjunction with the following figures, wherein.

DESCRIPTION OF THE PREFERRED EMBODIMENTS

Figure 1:
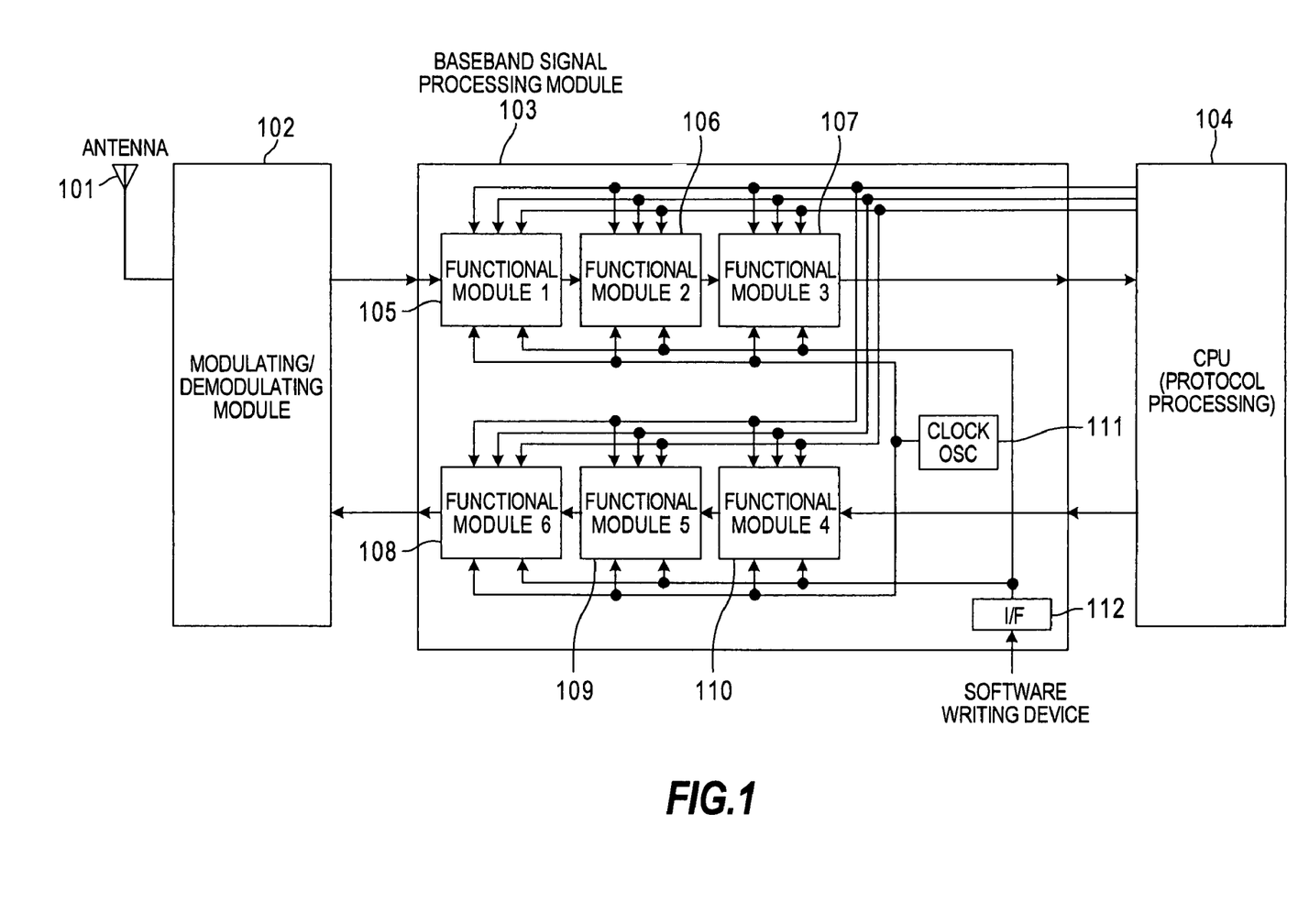
FIG. 1 is a drawing showing an example of the construction of the software-defined radio apparatus of this invention.

FIG. 1 shows an example of the configuration of the software-defined radio apparatus of this invention. During data transmission, a baseband signal processing module 103 converts transmission data outputted from a protocol processing unit 104 (CPU) into a signal suitable for a radio system, and a modulating/demodulating module 102 converts the signal converted in the baseband signal processing module 103 into a radio-frequency signal and outputs to an antenna 101. During data reception, the modulating/demodulating module 102 converts a radio-frequency signal inputted from the antenna 101 into a baseband band signal, and the baseband signal processing module 103 demodulates the converted signal, and sends to the protocol processing unit 104 as reception data. The baseband signal processing module 103 includes an interface 112 for writing data into the functional modules 105 to 110 functioning by executing software, a clock oscillator 111, and an interface 112 for using to write the software. Though there are six functional modules in FIG. 1, this is only an example and the number of functional modules is not limited to six.

Transmission data inputted to the baseband signal processing module 103 from the protocol processing unit 104 is sent to the functional modules 110, 109 and 108 in that order synchronously with clock signal outputted from the clock oscillator 111 and is processed in the respective functional modules. A signal outputted from the functional module 108 of a final stage is sent to the modulating/demodulating module 102. Each of the functional modules performs processing of small units of baseband signal processing such as encoding, spectrum spreading and phase modulation. A baseband reception signal sent to the baseband signal processing module 103 from the modulating/demodulating module 102 is sent to the functional modules 105, 106, and 107 in that order synchronously with clock signal outputted from the clock oscillator 111, is processed in the respective functional modules, and is sent to the protocol processing module 104 from the functional module 107 of the final stage. The functional modules perform processing such as phase demodulation, back diffusion and decoding.

Figure 2:
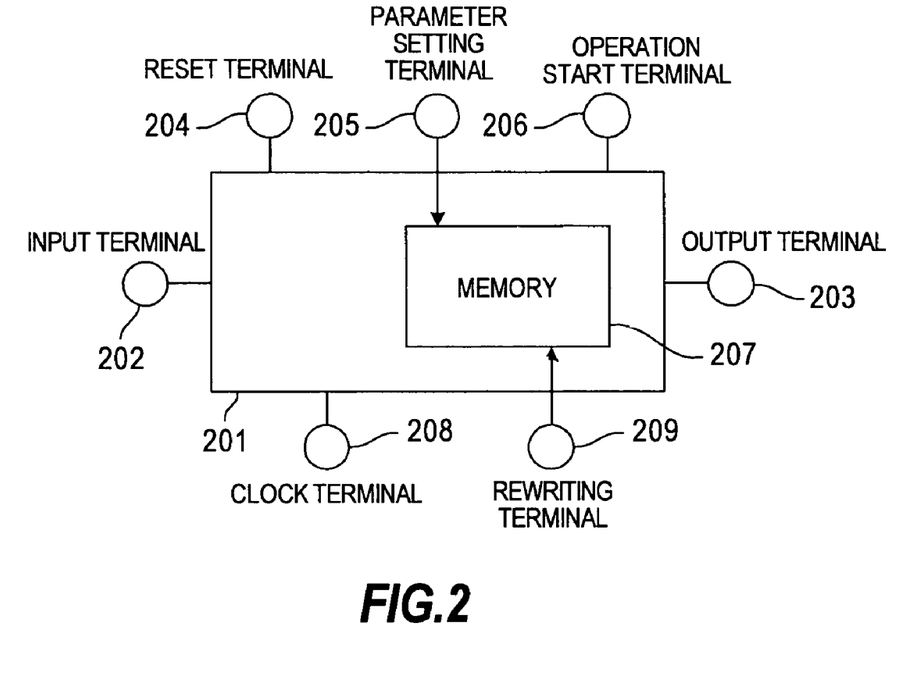
FIG. 2 is a functional drawing of a functional module of a signal processing module.

FIG. 2 shows an example of a functional block in this invention. The functional block has an input terminal 202 that is inputted data to be processed, an output terminal 203 that outputs a signal processing result, a reset terminal 204 to which a reset signal for performing initialization when power is turned on is inputted, a parameter setting terminal 205 to which parameter information for setting parameters necessary for signal processing after reset is inputted, an operation start terminal 206 to which a start signal for indicating signal processing after the setting of the parameters is inputted, a memory 207 for storing a signal processing program, a clock terminal 208 that supplies an operation clock, a memory rewriting terminal 209 that feeds a content written to the memory 207. The numbers of input terminals and output terminals is not limited to one, the functional module may include plural input terminals and plural output terminals. Since the input terminal 202 is used to receive data from a functional module of prior stage and control signals of the functional modules of prior stage and subsequent stage, it is connected to an output terminal of the functional module of prior stage or subsequent stage. Since the output terminal 203 is used to transmit control signals to the functional modules of prior stage and subsequent stage and data to the functional module of subsequent stage, it is connected to an input terminal of the functional module of prior stage or subsequent stage. The functional module, without having an input terminal, may output signals internally generated.

The functional module shown in FIG. 2 is controlled by software or constituted by only software. The software is inputted from the rewriting terminal 209 and is stored in the memory 207. Plural functional modules exist as shown in FIG. 1, and all of them have a configuration and interfaces that are shown in FIG. 2. The structure of the input and output terminals is standardized. The functional modules shown in FIG. 2 functions only by a program such as DSP, functions as software or data written to reconfigurable hardware such as FPGA, or functions by both software or data written to FPGA and the like, and a program such as DSP that controls it. The terminals shown in FIG. 2 function as interfaces within a program when the functional module functions by a program such as DSP. The terminals shown in FIG. 2 function as signal lines of blocks constituted within FPGA when the functional module functions within FPGA. In either case, the terminals are realized by a software-based configuration.

Figure 3:
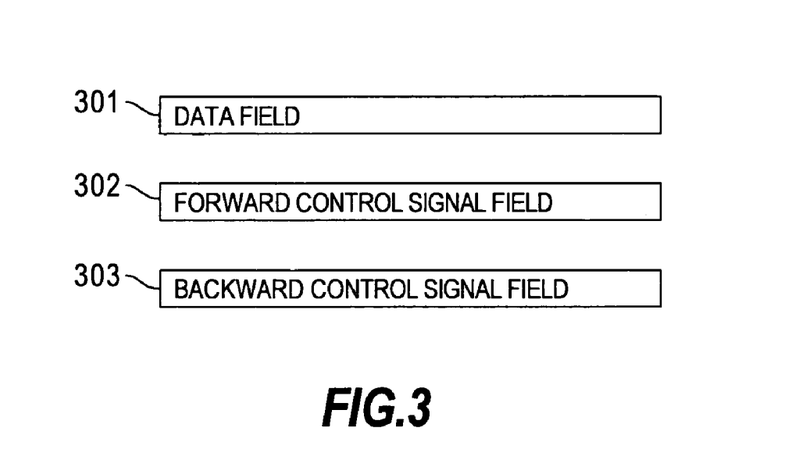
FIG. 3 is a drawing showing a signal format.

FIG. 3 shows an example of the format of signals inputted and outputted between an input terminal and an output terminal of the functional module. The input and output signal includes a data field 301 for transmitting data used for signal processing, a forward control signal field 302 for transmitting control information of the same direction as a data flow such as content included in the data field, and a backward control signal field 303 for transmitting control information of the direction opposite to a data flow such as information indicating that next data can be received. The data field comprises plural bits, for instance, 32 bits. The size of the control signal field is determined according to the amount of control information to be transmitted. For example, a backward control signal field may have one bit when only information of busy state or busy reset is transmitted in the backward control signal. The number of bits may depend on the fields. The data field 301, which is used to receive and send the data for which signal processing is performed, is outputted from an output terminal of the functional module and inputted to an input terminal to which the output terminal is connected. The forward control signal field 302, which includes the type of data of the data field and an identifier indicating effective data, is used by the functional module that has received data of the data field 301, to determine what the data is, and decide processing content. If the forward control signal field is used to transmit control information in the same format from the forefront stage to the final stage in a line of the respective functional modules of a transmission system and a reception system, control information required in the functional modules of subsequent stage can be transmitted through the functional modules of intermediate stage from a functional module of the forefront stage. Therefore, the functional modules can be controlled without a central control module. The backward control signal field 303, which transmits control information in the direction opposite to the flow of signal of the data field 301, is outputted from an input terminal of a subsequent stage and inputted to an output terminal of prior stage. The backward control signal field 303 includes a busy signal indicating whether the functional module can receive next data.

Figure 4:
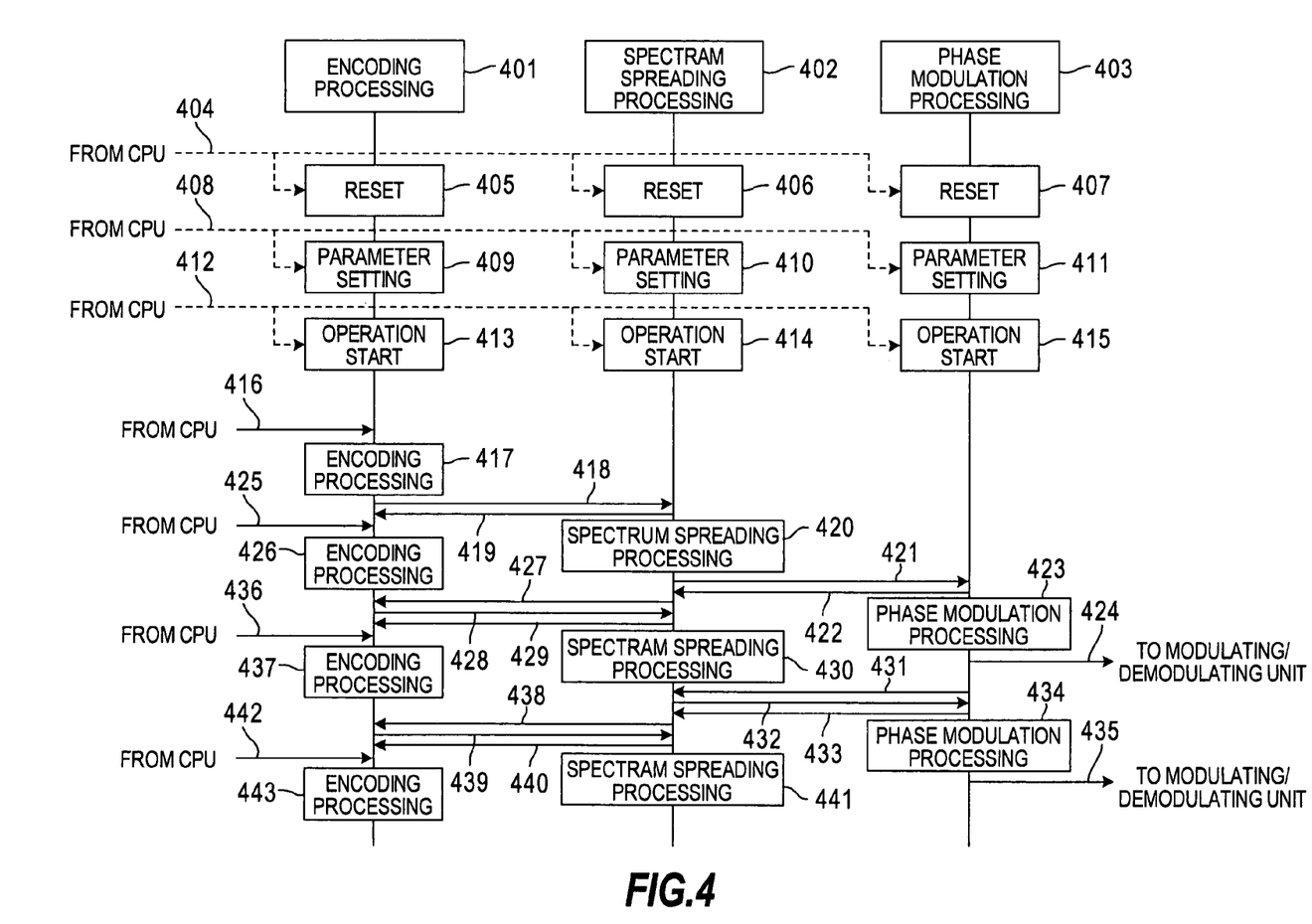
FIG. 4 is a process drawing showing the operation of the functional module of a signal processing module.

FIG. 4 shows the operation of the baseband signal processing module 103. Processing of a transmission side is shown in FIG. 4. The functional module 110 performs encoding, the functional module 109 performs spectrum spreading, and the functional module 108 performs phase modulation. The flow chart shown in FIG. 4 includes a processing flow 401 performed by the functional module 110 that performs encoding processing, a processing flow 402 performed by the functional module 109 that performs spectrum spreading, and a processing flow 403 performed by the functional module 108 that performs phase modulation processing. A reset signal 404 is inputted to each of the functional modules from the CPU 104 that performs protocol processing. The reset signal 404 is sent to the respective functional modules to perform reset processing 405, 406 and 407. Next, parameter setting signal 408 is inputted from the CPU 104 to perform parameter setting processing 409, 410 and 411. After completion of parameter setting, an operation start signal 412 is sent from the CPU 104 to perform operation start processing 413, 414 and 415, then the functional modules 110, 109, and 108 start the respective operations.

Transmission data 416 sent from the CPU 104 is inputted to the functional module 110 that performs encoding processing, where encoding processing 417 is performed. Data 418 for which the encoding processing has been performed is sent to the functional module 109 that performs spectrum spreading. The functional module 109 sends a busy signal 419 to the functional module 110 to indicate not in preparation to receive next data, and then the functional module 109 executes spectrum spreading 420 for the data 418. However, the functional module 109 waits for next effective data without executing the spectrum spreading 420 when a forward control signal corresponding to the data 418 indicates the ineffectiveness of the data. Spectrum spread data 421 is sent to the functional module 108 that performs phase modulation processing. After receiving the data, the functional module 108 sends a busy signal 422 to the functional module 108, and then performs phase modulation processing. The functional module 109 sends a busy release signal 427 to the functional module 110 to receive next data after sending the data 421 to the functional module 108. After sending the data 418, the functional module 110 receives next transmission data 425 from the CPU 104 and performs encoding processing 426. However, the functional module 110 waits for next effective data without executing the encoding processing 426 when a forward control signal corresponding to the data 425 indicates the ineffectiveness of the data. The encoded data 428 is sent to the functional module 109 after the busy release signal 427 is received. After this, like the previous data, spectrum spreading 430 and phase modulation processing 434 are performed, and the data is sent to the modulating/demodulating module 102. Data 436 and 442 from the CPU 104 are also encoded, spectrum spreaded and phase modulated in the functional modules, and then the data 436 and 442 are sent to the modulating/demodulating module 102. Data input and output between the functional modules is performed synchronously with a clock signal supplied from the clock oscillator 111 along with control information indicating the type of the data.

In this embodiment, since timing information such as information indicating the data on which signal processing in each of the functional module is to begin is transmitted corresponding with data transferred between the functional modules as control information, the individual functional modules can perform timing control independent of one another without having to provide a module that manages timing of the entire radio apparatus. Since a busy state is conveyed by backward control, even when the functional modules that are different from one another in processing speed and processing cycle are connected, data can be transferred without having to perform timing management for the entire radio apparatus. Specifically, it is not necessary that all of the functional modules of the baseband processing unit operate synchronously so long as data input and output between the functional modules is synchronized by a busy signal, and timing management can be simplified. This leads to an increase in reusability because of increased independence of the functional modules.

In this invention, clock signal is used for data transfer timing between the functional modules and operation timing within the functional modules. Start and end timings of signal processing of each of the functional module are decided depending on timing information corresponding with the data. Specifically, within each of the functional module, since the start and end of signal processing are performed based on the busy signal, individual signal processing can be performed asynchronously, not at predetermined timing. Therefore, the CPU 104 neither needs strictly control the timing of signal processing, nor provides a block to control the timing of the whole. As a result, timing design can be easily performed and software development can become easily.

Figure 9:
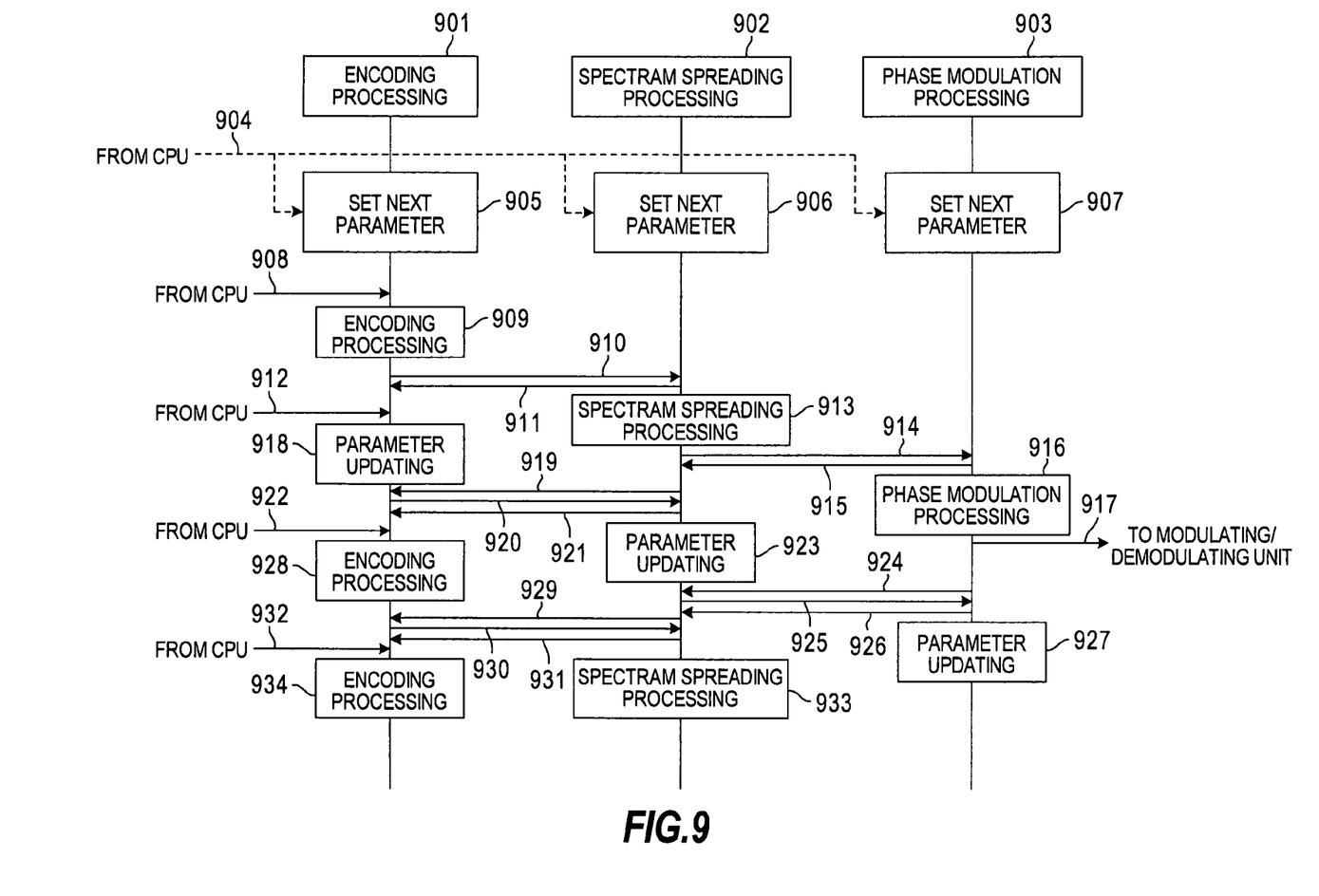
FIG. 9 is a process drawing showing the operation of the functional module that uses a forward control signal.

There are cases where processing parameters are updated on the way to signal processing in the software-defined radio apparatus. In the embodiment of this invention, parameters are updated asynchronously among the functional modules. FIG. 9 shows the operation of the signal processing module 103 during parameter updating in this invention. Like the processing shown in FIG. 4, processing of a transmission side is shown in FIG. 9 The functional module 110 performs encoding, the functional module 109 performs spectrum spreading, and the functional module 108 performs phase modulation. A flow chart shown in FIG. 9 includes a parameter updating flow 901 performed by the functional module 110 that performs encoding processing, a parameter updating flow 902 performed by the functional module 109 that performs spectrum spreading, and a parameter updating flow 903 performed by the functional module 108 that performs phase modulation processing. A parameter 904 to be changed is inputted from the CPU 104, and parameters used for updating are set in the functional modules by processing 905, 906 and 907. In this stage, the functional modules only receive the parameters, which are not reflected in signal processing. Therefore, the parameter setting 904 from the CPU may be performed at any timing before the parameter is actually updated, asynchronously with the flow of signal processing. That is, data 908 inputted from the CPU 104 is encoded 909, is spectrum spread 913, and is phase modulated 916 with pre-update parameters, and is sent to the radio modulating unit as a baseband signal 917. In this case, like the processing shown in FIG. 4, the data is transferred between the functional modules by 910 and 914, and busy control is performed using busy signal 911 and 915. The CPU 104 send a parameter updating command 912 to the functional module 110 to reflect parameter updating in the content of signal processing. Upon receiving the parameter updating command 912, the functional module 110 performs parameter updating 918 and reflects the parameter received in 905 in processing for the next data to be received. The functional module 110 also sets a parameter updating command 920 in a forward control signal, and sends the parameter updating command 920 to the next functional module 109. Since the parameter updating command 920 is also sent according to busy control, the functional module 110 sends it after receiving a busy release signal 919 from the functional module 109. Upon receiving a parameter updating command 921, after sending a busy signal 921 to the functional module 108, the functional module 109 executes its own parameter updating 923. Likewise, the functional module 109 sends a parameter updating command 925 to the next functional module 910 after receiving a busy release signal 924 from the next functional module 110. Upon receiving a parameter updating command 925, the functional module 110 performs its own parameter updating after sending a busy signal 926 to the functional module 109. Since the functional module 110 is a final stage, it is not necessary to send a parameter updating signal to a next stage. In this way, during parameter updating, since parameters are transferred in the same procedure as data, the CPU 104 does not need to strictly manage the timing of parameter updating, so that timing design can become easily.

The functional modules of this embodiment can be freely formed into a branch structure or a junction structure by branching and merging connections of input terminals and output terminals. Therefore, modules having small functions can be organized into large modules by combining them, providing flexibility for development.

Likewise for reception processing, phase demodulation is performed in the functional module 103, de-spreading in the functional module 104, and decoding in the functional module 105. Like the procedure shown in FIG. 4, data and control signals are transferred between the functional modules.

Figure 5:
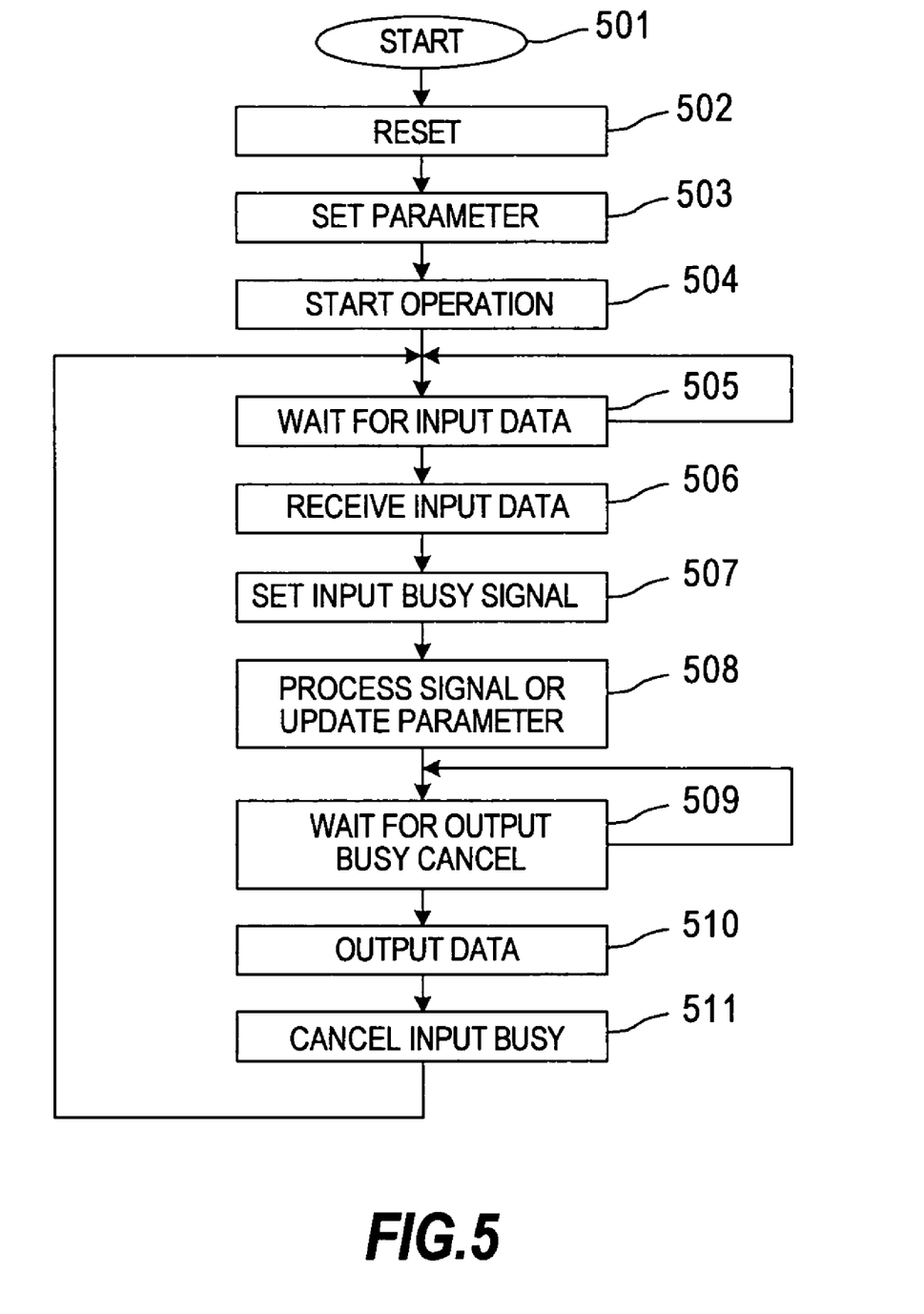
FIG. 5 is a flow drawing showing the processing of the functional module that uses a backward control signal.

FIG. 5 shows flow chart of an operation of a functional module. The flow chart of the functional module starts from 501. First in Step 502, the functional module receives reset from the CPU 104 through the reset terminal 204 to perform initialization. After receiving parameter setting from the CPU 104 through the parameter setting terminal 205 in Step 503. The functional module receives an operation start signal from the CPU 104 through the operation start terminal 206, and starts operation as the functional module, in Step 504. After the operation is started, in Step 505, the functional module waits until input data (transmission/reception data or forward control signal) arrives. When data (transmission/reception data or forward control signal) is sent from a functional module of prior stage, in Step 506, the data (transmission/reception data or forward control signal) is received through the input terminal 202. In Step 507, a busy signal is sent to the functional module of prior stage from the output terminal 203 to indicate that next data cannot be received. A functional module, if having plural buffers to receive input data, does not return a busy signal when there is an empty buffer, and returns a busy signal when all buffers have been filled with data. The received data is processed in Step 508. The signal processing is defined in advance by software, and has different contents depending on the types of functional blocks. If the received data includes a parameter updating command, parameter updating is performed. The data having been processed is sent to a functional module of next stage in Step 510 after it is confirmed in Step 509 that a busy state of the functional module of next stage of output side has been released. By receiving a busy release signal from the output side through the input terminal 202, it can be determined that the functional module of next stage has become ready to reception data. Since the functional module becomes ready to receive next data by sending data to a functional block of next stage, a busy release signal is sent to the functional module of prior stage from the output terminal 203 in Step 511, and returns to Step 505 to wait for the next data to arrive. Operations from Step 506 are repeated for the next data. Though the content of the signal processing shown in Step 508 is different depending on the kind of the functional modules, the flow of processing is standardized among all of the functional modules.

Figure 6:
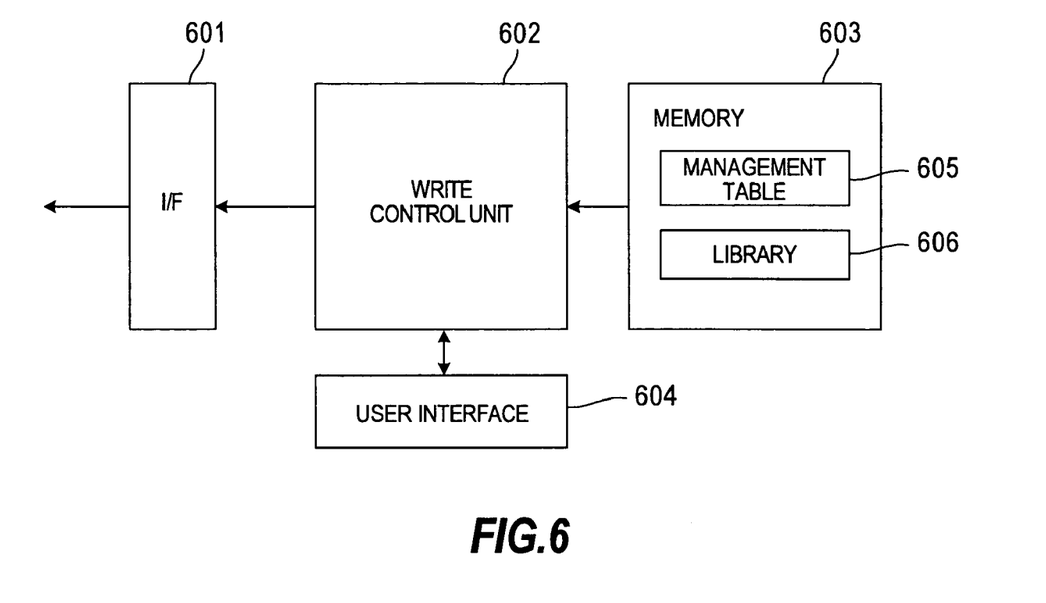
FIG. 6 is a drawing showing the construction of a software writing device.

The functional module is constructed by software, which is written from an external writing device through the rewriting terminal 209. FIG. 6 shows an example of the configuration of a writing device. The writing device comprises an interface 601, a write control unit 602, a memory 603, a user interface 604, a software management table 605, a library 606 in which software is stored. When a user gives a rewriting command through the user interface 604, the write control unit 602 searches the management table 605 in the memory 603 for software information of an appropriate radio system. When the appropriate radio system is found in the management table, the write control unit 602 retrieves software corresponding to the given rewriting command from the library 606 and delivers the retrieved software to the software-defined radio apparatus through the interface 601. At this time, information about the software-defined radio apparatus may be obtained through the interface 601 so as to determine whether the software-defined radio apparatus can execute the retrieved software. The interface 601 and the user interface 604 are used to write the library to the radio apparatus from the writing device, and add a new library to the memory.

Figure 7:
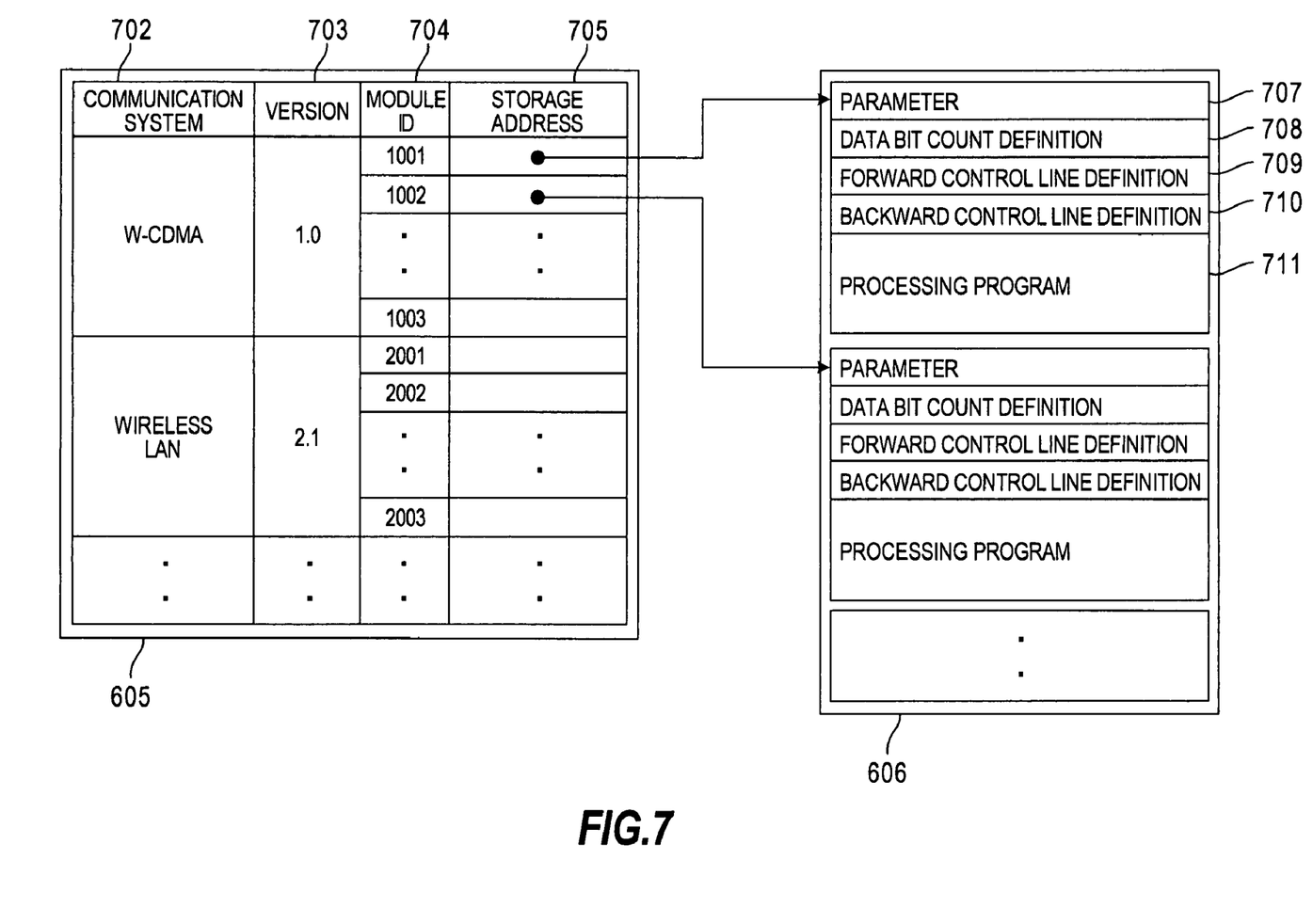
FIG. 7 is a drawing showing the layout of a software management table and a software library.

FIG. 7 shows an example of the layout of the management table 605 and the library 606 that are stored in the memory 603. Software management information of different radio systems is stored in the management table 605. In the example of FIG. 7, the management table 605 includes, in the form of a table, a radio system names 702, a version numbers 703, an identifier of functional modules used 704 and addresses 705 in which contents of the library of functions to be set in the functional modules are stored. In this embodiment, the management table 605 is formed in table configuration, but the management table 605 may be formed in another layout including necessary information. Content of software and attribute information of different functional modules are stored in the library 706. In the example shown in FIG. 7, parameters 707, data bit count definitions 708, forward control line definitions 709, backward control line definitions 710 and processing programs 711 are stored in the library 606.

Figure 8:
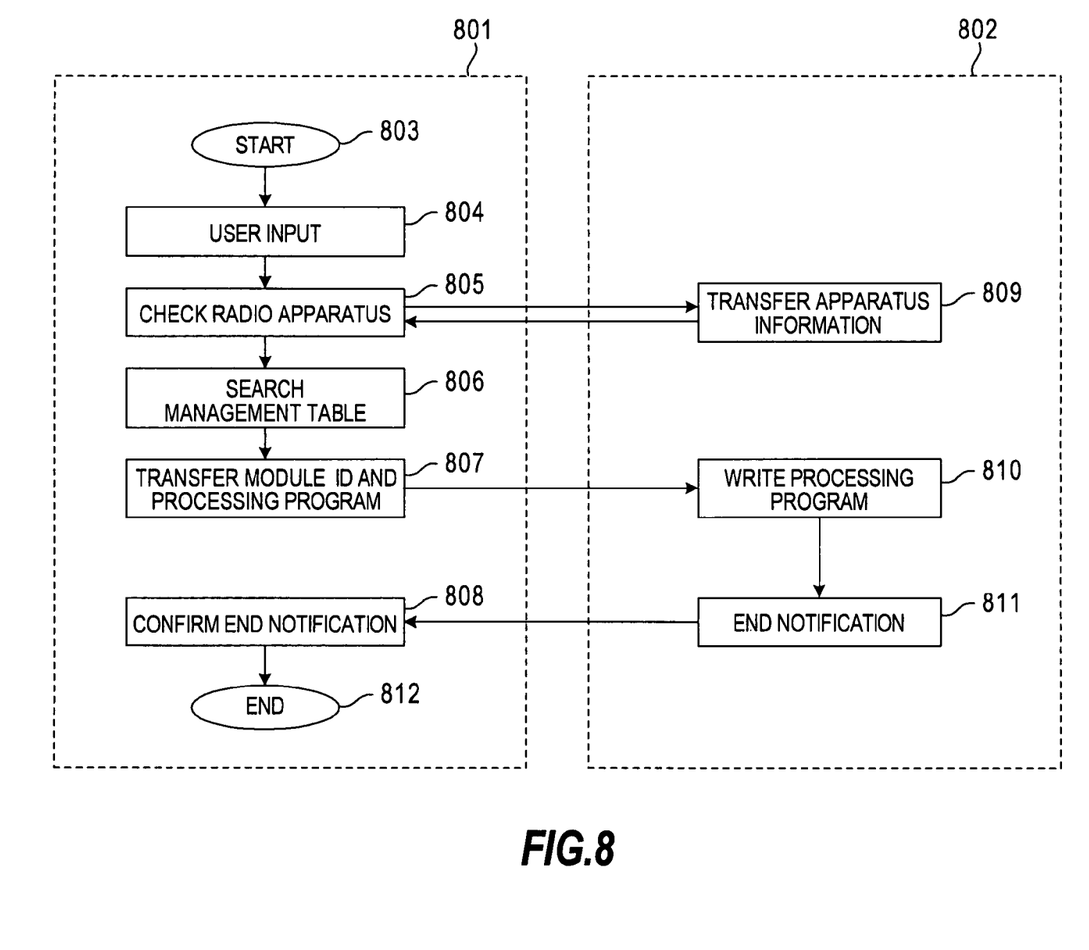
FIG. 8 is a flow drawing showing software writing processing.

FIG. 8 shows an example of a procedure by which the writing device shown in FIG. 6 writes software to the baseband processing unit 103. A flow chart shown in FIG. 8 includes the operation of the writing device side 801, and the operation of the baseband processing unit 103 side 802. Operation started from 803 is followed by a user input 804 which is performed through the user interface 604. In the information inputted by the user 804 includes a radio system, a version number and other information. A check processing 805 is made to determine whether the system matches the radio apparatus. At this time, information on the radio apparatus may be transferred 809 from the baseband processing unit 103 of the radio apparatus. If it is determined from the information on the radio apparatus that the radio apparatus complies with a radio system to be rewritten, the writing device searches in the management table 701 for a corresponding radio system 806. If an appropriate radio system and version are found in the management table 701, a corresponding module ID and the content of the software, attribute information and the like, which are stored in a library address 705, are transferred to the baseband processing unit 103 in Step 807. In Step 810, the baseband processing unit 103 stores received processing programs with translating a form corresponding with the functional module. As shown in FIG. 2, each of different functional modules stores the software in the memory 207. However, a common memory may be provided which stores software for plural functional modules. After writing all processing programs, the baseband processing unit 103 sends end notification 811 to the writing device. The writing device receives the end notification in Step 808 and proceeds to Step 812 to complete the writing operation. The above-mentioned communication between the baseband processing unit 103 and the writing device is performed between the interface 112 of the radio apparatus and the interface 601 of the writing device.

To create a library of the functional modules of the software-defined radio apparatus, verification of a function is required for each of the functional modules. Also, verification is required when the software-defined radio apparatus is constructed by combining functional modules. In the verification of the function, the confirmation of the operation of the radio apparatus is finally required in hardware that executes the software. However, in a development stage, the verification of the function can be simplified by using a simulator that simulates the entire radio apparatus for each of the functional modules and for a combination of the functional modules. The library for which the verification by the simulator and the verification in actual hardware are completed is stored in a memory of the writing device in a fixed format as described in FIG. 7.

As has been described in detail, by using the embodiment of this invention, distributed processing of timing control can be performed in the software-defined radio apparatus. Thereby, independence of functional modules constituting the software-defined radio apparatus can be increased, and a library having a high degree of reusability can be created. Since an independent timing control unit dependent on radio systems does not need to be provided, radio systems can be easily changed by rearranging functional modules.

While the present invention has been described in detail and pictorially in the accompanying drawings, the present invention is not limited to such detail but covers various obvious modifications and equivalent arrangements, which fall within the purview of the appended claims.

What is claimed is:

1. A radio apparatus, comprising:
an antenna that transmits and receives a radio signal;
a modulating/demodulating module, connected to the antenna, which modulates a transmission signal to a radio-frequency signal, and demodulates a reception signal from a radio-frequency signal;
a signal processing module, connected to the modulating/demodulating module, which performs signal processing for a transmission/reception signal; and
a CPU, connected to the signal processing module, which performs protocol processing for a transmission/reception signal,
wherein the signal processing module includes plural functional blocks, which perform signal processing for transmission signal data or reception signal data, and whose function is defined by an installed program, and
wherein each of the functional blocks sends, to the functional block of the prior stage, busy state information indicating whether the functional block is in preparation to receive next transmission signal data or next reception signal data as a backward control signal, and outputs, to the functional block of the next stage, transmission signal data or reception signal data having been processed in the functional block when receiving busy state information indicating in preparation to receive next transmission signal data or reception signal data from a functional block of a subsequent stage.

2. The radio apparatus according to claim 1, wherein each of the functional blocks is supplied with a clock signal from a common clock oscillator, performs signal processing according to the clock signal, and transfers the transmission signal data or the reception signal data to a functional block of a prior stage or a subsequent stage according to the clock signal.

3. The radio apparatus according to claim 1, wherein each of the functional blocks outputs, to the functional block of the prior stage, busy state information indicating in preparation to receive the next transmission signal data or the next reception signal data, upon outputting, to the functional block of the subsequent stage, transmission signal data or reception signal data having been processed in the functional block.

4. The radio apparatus according to claim 1, wherein each of the functional blocks:
receives a forward control signal corresponding with the transmission signal data or the reception signal data from the functional block of a prior stage;
performs signal processing for transmission signal data or reception signal data corresponding with the received forward control signal, using the received forward control signal, when the received forward control signal includes information relating to a signal processing of the functional block;
performs signal processing for transmission signal data or reception signal data corresponding with the received forward control signal, without using the received forward control signal, when the received forward control signal does not include information relating to a signal processing of the functional block; and
outputs, to a functional block of a subsequent stage, the processed transmission signal data or the processed reception signal data corresponding with the received forward control signal.

5. The radio apparatus according to claim 4, wherein the forward control signal includes the type of the transmission signal data or the reception signal data corresponding with the received forward control signal, or information indicating whether the transmission signal data or the reception signal data is effective or ineffective.

6. The radio apparatus according to claim 5, wherein the functional blocks does not performs signal processing when the received forward control signal includes information indicating that the transmission signal data or reception signal data corresponding with the received forward control signal is ineffective.

7. The radio apparatus according to claim 4, wherein the forward control signal is transferred in the same format from a functional block of the forefront stage to a functional block of the final stage of a transmission processing system or a reception processing system, among the plural functional blocks.

8. The radio apparatus according to claim 4,
wherein the CPU notifies the functional block of a change a method of processing the transmission signal data or the reception signal data based on the protocol processing when the change is determined, and notifies the functional block of the forefront stage of a transmission processing system or an reception processing system that information for indicating the change timing is included in the forward control signal corresponding with transmission signal data or reception signal data which is object of the change, and
wherein the functional block notified of the change performs signal processing based on the notified change for the transmission signal data or reception signal data corresponding with the received forward control signal when receiving the forward control signal including the timing information.

9. A radio communication signal processing method in a radio apparatus comprising: an antenna that transmits and receives a radio signal; a modulating/demodulating module, connected to the antenna, which modulates a transmission signal to a radio-frequency signal, and demodulates a reception signal from a radio-frequency signal; a signal processing module, connected to the modulating/demodulating module, which performs signal processing for a transmission/reception signal; a CPU, connected to the signal processing module, which performs protocol processing for a transmission/reception signal; plural functional blocks, included in the signal processing module, that perform signal processing for transmission signal data or reception signal data, function of the functional blocks being defined by an installed program, the method comprising:
a first step of sending, to the functional block of the prior stage, busy state information indicating whether the functional block is in preparation to receive next transmission signal data or next reception signal data as a backward control signal, and
a second step of outputting, to the functional block of the next stage, transmission signal data or reception signal data having been subjected to signal processing in the functional block when receiving busy state information indicating in preparation to receive next transmission signal data or reception signal data from a functional block of a subsequent stage.

10. The radio communication signal processing method according to claim 9, further comprising
a third step of supplying each of the functional blocks with a clock signal from a common clock oscillator,
wherein, in the second step, the transmission signal data or the reception signal data is transferred to a functional block of a prior stage or a subsequent stage by using the clock signal.

11. The radio communication signal processing method according to claim 9, further comprising the steps of, in each of the functional blocks, outputting, to the functional block of the prior stage, busy state information indicating in preparation to receive the next transmission signal data or the next reception signal data, upon outputting, to the functional block of the subsequent stage, transmission signal data or reception signal data having been processed in the functional block.

12. The radio communication signal processing method according to claim 9, further comprising:
a fourth step of receiving by each of the functional blocks a forward control signal corresponding with the transmission signal data or the reception signal data from the functional block of a prior stage;
a fifth step of performing signal processing for transmission signal data or reception signal data corresponding with the received forward control signal, using the received forward control signal, when the received forward control signal includes information relating to a signal processing of the functional block, and performing signal processing for transmission signal data or reception signal data corresponding with the received forward control signal, without using the received forward control signal, when the received forward control signal does not include information relating to a signal processing of the functional block; and
a sixth step of outputting, to a functional block of a subsequent stage, the processed transmission signal data or the processed reception signal data corresponding with the received forward control signal.

13. The radio communication signal processing method according to claim 12, further comprising the steps of including in the forward control signal the type of the transmission signal data or the reception signal data corresponding with the received forward control signal, or information indicating whether the transmission signal data or the reception signal data is effective or ineffective.

14. The radio communication signal processing method according to claim 13, wherein, in the fifth step, signal processing in the functional block is not performed when the received forward control signal includes information indicating that the transmission signal data or reception signal data corresponding with the received forward control signal is ineffective.

15. The radio communication signal processing method according to claim 12, further comprising the steps of transferring the forward control signal in the same format from a functional block of the forefront stage to a functional block of the final stage of a transmission processing system or a reception processing system, of the plural functional blocks.

16. The radio communication signal processing method according to claim 12, further comprising:
a seventh step notifying, by the CPU, a functional block of a change a method of processing the transmission signal data or the reception signal data based on the protocol processing when the change is determined;
an eighth step of notifying the functional block of the forefront stage of a transmission processing system or an reception processing system that timing information for indicating the change timing is included in the forward control signal corresponding with transmission signal data or reception signal data which is object of the change, at the same time of performing the seventh step; and
a ninth step of performing, in the functional block notified of the change, signal processing based on the notified change for the transmission signal data or reception signal data corresponding with the received forward control signal when receiving the forward control signal including the timing information.

* * * * *